US012746680B2

(12) United States Patent
Harada

(10) Patent No.: US 12,746,680 B2
(45) Date of Patent: Sep. 29, 2026

(54) COMMAND VALUE CORRECTION DEVICE AND ROBOT SYSTEM

(71) Applicant: FANUC CORPORATION, Yamanashi (JP)

(72) Inventor: Kunihiko Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 122 days.

(21) Appl. No.: 18/248,439

(22) PCT Filed: Dec. 10, 2021

(86) PCT No.: PCT/JP2021/045662
§ 371 (c)(1),
(2) Date: Apr. 10, 2023

(87) PCT Pub. No.: WO2022/131172
PCT Pub. Date: Jun. 23, 2022

(65) Prior Publication Data

US 2023/0364793 A1 Nov. 16, 2023

(30) Foreign Application Priority Data

Dec. 16, 2020 (JP) ................................ 2020-208462

(51) Int. Cl.
*B25J 9/16* (2006.01)

(52) U.S. Cl.
CPC ........... *B25J 9/1692* (2013.01); *B25J 9/1671* (2013.01)

(58) Field of Classification Search
CPC ........ B25J 9/1692; B25J 9/1671; B25J 9/163; G05B 2219/39182; G05B 2219/40582
See application file for complete search history.

(56) References Cited

U.S. PATENT DOCUMENTS 5,418,441 A * 5/1995 Furukawa .............. B25J 9/1641 318/568.22
2015/0100156 A1* 4/2015 Jonsson ................. B25J 9/1653 700/245

(Continued)

FOREIGN PATENT DOCUMENTS

DE 10 2013 017 007 A1 4/2015
JP H08-171410 A 7/1996

(Continued)

OTHER PUBLICATIONS

International Search Report issued in PCT/JP2021/045662; mailed Feb. 1, 2022.

*Primary Examiner* — Abby Lin
*Assistant Examiner* — Renee LaRose
(74) *Attorney, Agent, or Firm* — Studebaker Brackett PLLC

(57) ABSTRACT

Provided is a command value correction device that can reduce positioning error for a robot. A command value correction device according to one embodiment of the present invention corrects a command value for directing the orientation of a articulated robot that positions a tip end of an arm that has a plurality of joints, the device comprising: a robot model setting unit that sets a robot model that represents the articulated robot with an elastically deformable model; a support model setting unit that sets a support model that represents a support, to which the articulated robot is secured, with an elastically deformable model; a force calculation unit that calculates a force that acts on the support by the weight of the articulated robot if the orientation of the articulated robot follows the command value prior to correction; and a correction unit that corrects the command value so as to cancel out elastic deformation of the (Continued)

support model due to the force calculated by the force calculation unit.

12 Claims, 5 Drawing Sheets

(56) References Cited

U.S. PATENT DOCUMENTS

| | | | | |
|---|---|---|---|---|
| 2017/0028555 | A1* | 2/2017 | Kokubo | B25J 9/1607 |
| 2020/0306976 | A1* | 10/2020 | Yuelai | B25J 9/1653 |

FOREIGN PATENT DOCUMENTS

| | | | |
|---|---|---|---|
| JP | H09-123075 | A | 5/1997 |
| JP | 2002-307344 | A | 10/2002 |
| JP | 2010-529910 | A | 9/2010 |
| JP | 2010-231575 | A | 10/2010 |
| JP | 2017-024142 | A | 2/2017 |
| JP | 2019-141983 | A | 8/2019 |
| JP | 2020-168669 | A | 10/2020 |

* cited by examiner

ERROR MODEL SETTINGS

NUMBER OF SUPPORT JOINT POINTS 3

JOINT POINT 1
X : 0 Y : 0 Z : −600 W : 180 P : 0 R : 180
SPRING X = 0.02
SPRING Y = 0.02
SPRING Z = 0.00

JOINT POINT2
X : −1800 Y : 0 Z : −600 W : 180 P : 0 R : 180
SPRING X = 0.00
SPRING Y = 0.20
SPRING Z = 0.10

JOINT POINT3
X : 0 Y : 0 Z : 1400 W : 180 P : 0 R : 180
SPRING X = 0.20
SPRING Y = 0.50
SPRING Z = 0.00

COMMAND VALUE CORRECTION DEVICE AND ROBOT SYSTEM

TECHNICAL FIELD

The present invention pertains to a command value correction device and a robot system.

BACKGROUND ART

A system has been widely used that uses an articulated robot, which includes a plurality of sections (links) connected via articulations (joints) having drive shafts and is configured such that an angle for a drive shaft is defined in accordance with a command value, to position a target object such as a workpiece or a tool, for example. For an articulated robot, the orientation (position and direction) of a target object is calculated from section lengths and shaft angles. However, due to, inter alia, a deflection in a section, error can arise between a calculated orientation for a target object and the actual orientation of the target object.

In order to reduce such error, it has been proposed to set a model that represents each section of a robot as a spring and calculating an amount of deflection that corresponds to the orientation of the robot to thereby correct a command value such that it is possible to accurately position a target object (for example, refer to Patent Document 1).

Patent Document 1: Japanese Unexamined Patent Application, Publication No. 2002-307344

DISCLOSURE OF THE INVENTION

Problems to be Solved by the Invention

When using a large articulated robot, a deflection also arises in a support such as the floor, beam, or trestle to which the robot is secured, and can be a cause of positioning error in a target object. In light of such actual circumstances, an object of the present invention is to provide a command value correction device and a robot system that can reduce positioning error for a robot.

Means for Solving the Problems

A command value correction device according to one aspect of the present invention is a command value correction device for correcting a command value for instructing an orientation of an articulated robot that positions a tip end of an arm having a plurality of joints. The command value correction device includes: a robot model setting unit that sets a robot model that represents the articulated robot by an elastically deformable model; a support model setting unit configured to set a support model that represents a support to which the articulated robot is secured, by an elastically deformable model; a force calculation unit that calculates a force that acts on the support according to the weight of the articulated robot in a case where the orientation of the articulated robot conforms to the command value before correction; and a correction unit that corrects the command value in such a manner as to cancel out an amount of support model elastic deformation that is elastic deformation for the support model due to the force calculated by the force calculation unit.

Effects of the Invention

By virtue of the present invention, it is possible to reduce positioning error for a robot.

PREFERRED MODE FOR CARRYING OUT THE INVENTION

Figure 1:
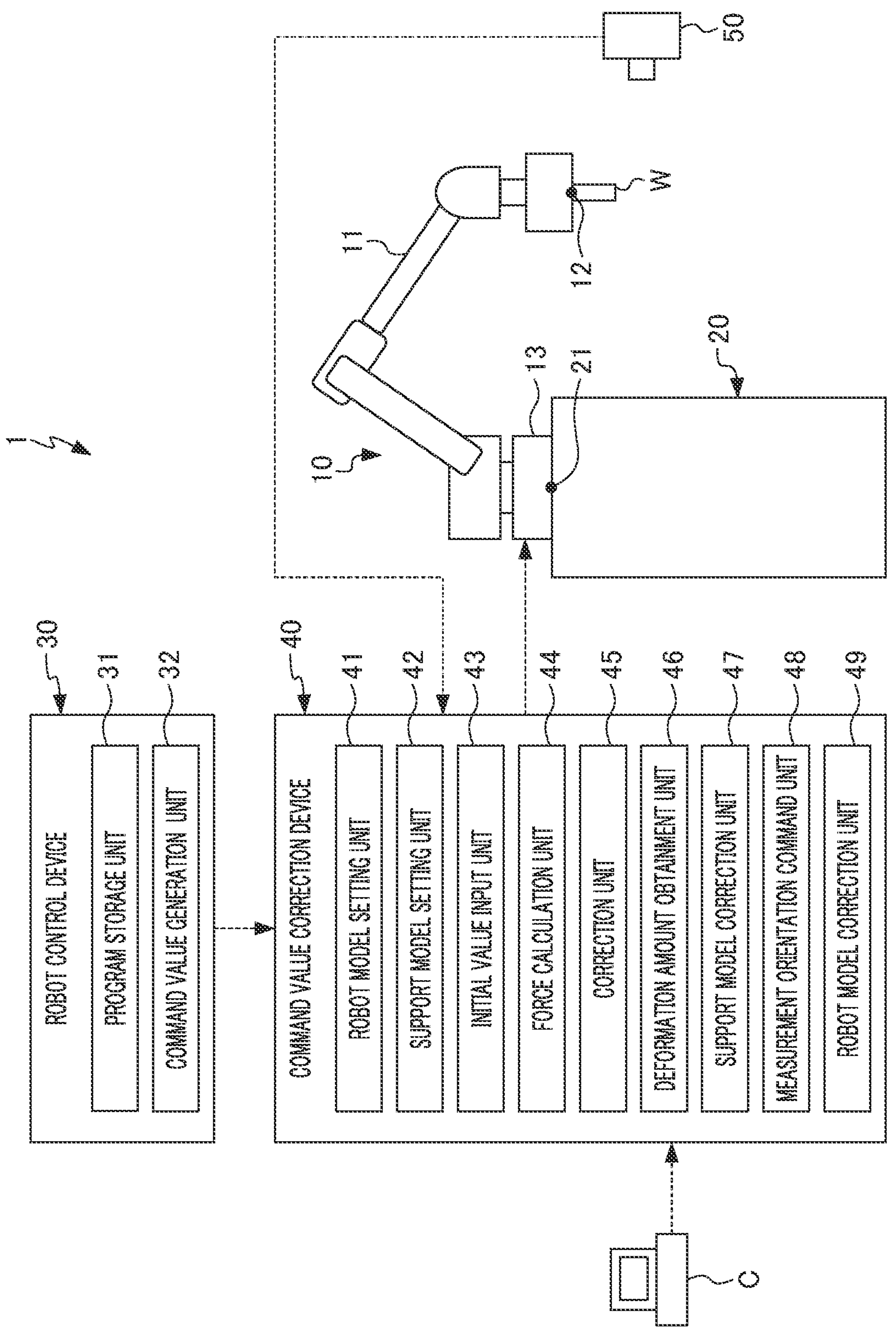
FIG. 1 is a schematic view that illustrates a configuration of a robot system according to one embodiment of the present invention.

Hereinafter, embodiments of the present invention will be described while referencing the drawings. FIG. 1 is a schematic view that illustrates a configuration of a robot system 1 according to one embodiment of the present invention.

The robot system 1 is provided with an articulated robot 10, a support 20, a robot control device 30, a command value correction device 40, and a three-dimensional measurement device 50.

A vertical articulated robot is typically used as the articulated robot 10; however, the articulated robot 10 may be a horizontal articulated robot. Specifically, the articulated robot 10 has an arm 11, including a plurality of sections (links) which are connected and a plurality of drive shafts that determine a relative angle between adjacent sections, and performs positioning that determines the position and direction of a tip end 12 belonging to the arm 11.

The articulated robot 10 is used to hold a target object W at the tip end 12 and position the target object W. For example, the target object W may be, inter alia, a cutting tool, a laser head, an inspection device, or a workpiece (an article to be subject to machining, inspection, or the like). For the articulated robot 10, normally a positioning operation is controlled in a robot coordinate system in which a base end 13 secured to the support 20 is set as a reference.

Due to elastic deformation by each section and elastic deformation by an internal mechanism belonging to a drive shaft, positioning error can arise for the articulated robot 10 in which the position of the tip end 12 deviates from a theoretical position calculated from the designed shape of each section and the controlled angular position of the drive shaft.

The support 20 is a member that supports the articulated robot 10, and can be configured from, for example, a floor, pillar, beam, concrete foundation, trestle, or a combination of these, and can further include a connector such as a bolt, for example. A reference support point 21 is set on the support 20 as a position that supports the articulated robot 10. As a specific example, the reference support point 21 can be established as the center point of an abutting surface with the base end 13 of the articulated robot 10.

The support 20 elastically deforms, albeit slightly, in response to an operation by the articulated robot 10, and can cause the reference support point 21 to move and undergo a change in direction, with reference to an immovable point that is in a world coordinate system, which is an absolute position for positioning the target object W. For example, in a case where the target object W is a cutting tool, the world coordinate system is a coordinate system in which a workpiece to be cut by the target object W is fixed. Even if change to the position and direction of the reference support point 21 is very small, due to causing the entirety of the articulated robot 10 to tilt, such elastic deformation can cause the position and direction of the tip end 12 on the articulated robot 10 to change by levels that cannot be ignored.

The robot control device 30 is a well-known component that includes a program storage unit 31 storing an operation program for designating an operation by the articulated robot 10, and generates a command value that designates angular positions necessary for respective drive shafts to position the tip end 12 of the articulated robot 10 in accordance with the operation program stored in the program storage unit 31. For example, the robot control device 30 can be configured by causing a computer having, inter alia, memory, a CPU, and an input/output interface to execute an appropriate control program.

The command value correction device 40 corrects a command value generated by the robot control device 30 in such a manner as to compensate for positioning error due to elastic deformation by the articulated robot 10 and the support 20. In other words, in the robot system 1, the articulated robot 10 operates in accordance with a command value that is corrected by the command value correction device 40 after being generated by the robot control device 30. The command value correction device 40 is itself one embodiment of a command value correction device according to the present invention.

For example, the command value correction device 40 can be configured by causing a computer having, inter alia, memory, a CPU, and an input/output interface to execute an appropriate control program. Although the command value correction device 40 may be configured by an independent computer, it is normally configured integrally with the robot control device 30. In other words, the command value correction device 40 can be realized as a function in a computer that configures the robot control device 30. The robot control device 30, the command value correction device 40, and respective components thereof are classified in terms of respective functionality, and do not need to be components that can be clearly classified in terms of program structure and physical configuration.

The command value correction device 40 has a robot model setting unit 41, a support model setting unit 42, an initial value input unit 43, a force calculation unit 44, a correction unit 45, a deformation amount obtainment unit 46, a support model correction unit 47, a measurement orientation command unit 48, and a robot model correction unit 49.

Figure 2:
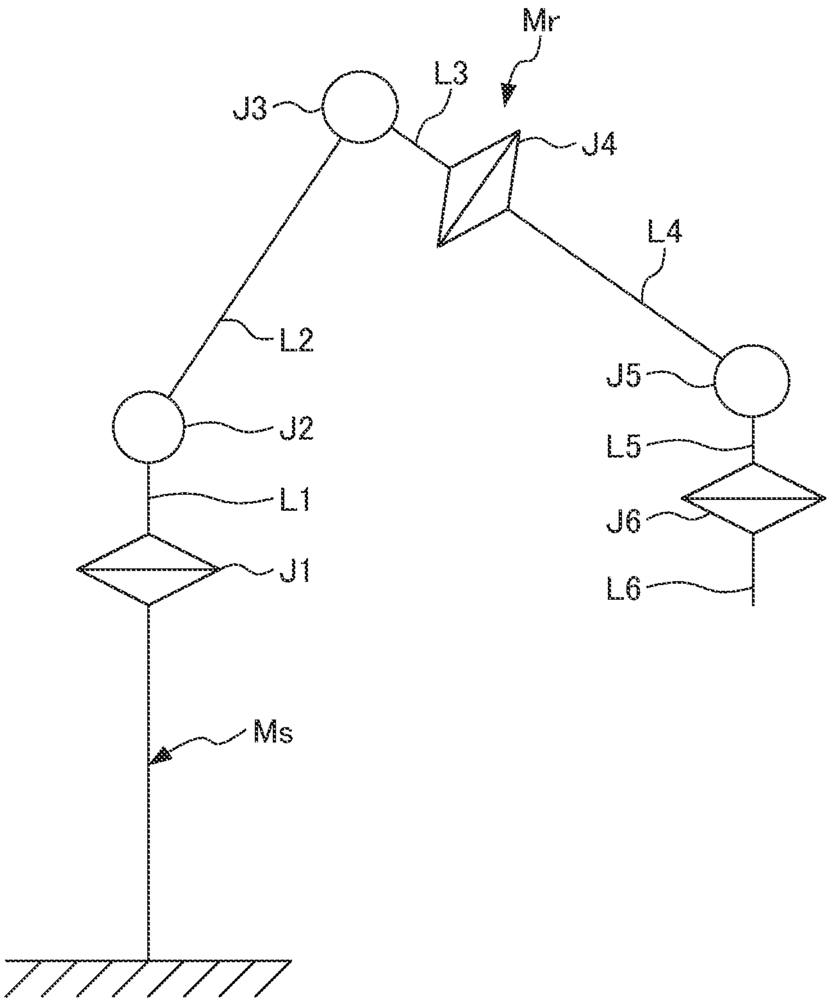
FIG. 2 is a schematic view that illustrates an example of setting a robot model in the robot system in FIG. 1.

As exemplified in FIG. 2, the robot model setting unit 41 sets a robot model Mr that represents the articulated robot 10 using a plurality of links (sections) L1, L2, L3, L4, and L5 and a plurality of joints (joints) J1, J2, J3, J4, J5, and J6 that connect adjacent links L1, L2, L3, L4, L5. It is possible to set the robot model Mr by a well-known method such as the Denavit and Hartenberg (DH) method. The links L1, L2, L3, L4, L5 are springs that are capable of bending deformation, and the joints J1, J2, J3, J4, J5, J6 are springs that are capable of torsional deformation. The robot model Mr can be set in advance for each articulated robot 10 product, as a standard specification for the command value correction device 40.

The support model setting unit 42 sets a support model Ms that represents, by an elastically deformable model, the support 20 to which the articulated robot 10 is secured. In a case where the support 20 is a base as illustrated in FIG. 1, the support model Ms can be represented as a single spring as illustrated in FIG. 2. However, as exemplified in FIG. 3, in accordance with the configuration of the support 20, the support model Ms may be represented as a combination of a plurality of springs having at least one joint point that moves or rotates in a direction parallel to a force acting on the support 20. In other words, the support model Ms can be set to a model that includes a spring that undergoes compressive or tensile deformation, and a spring that undergoes bending deformation.

Figure 3:
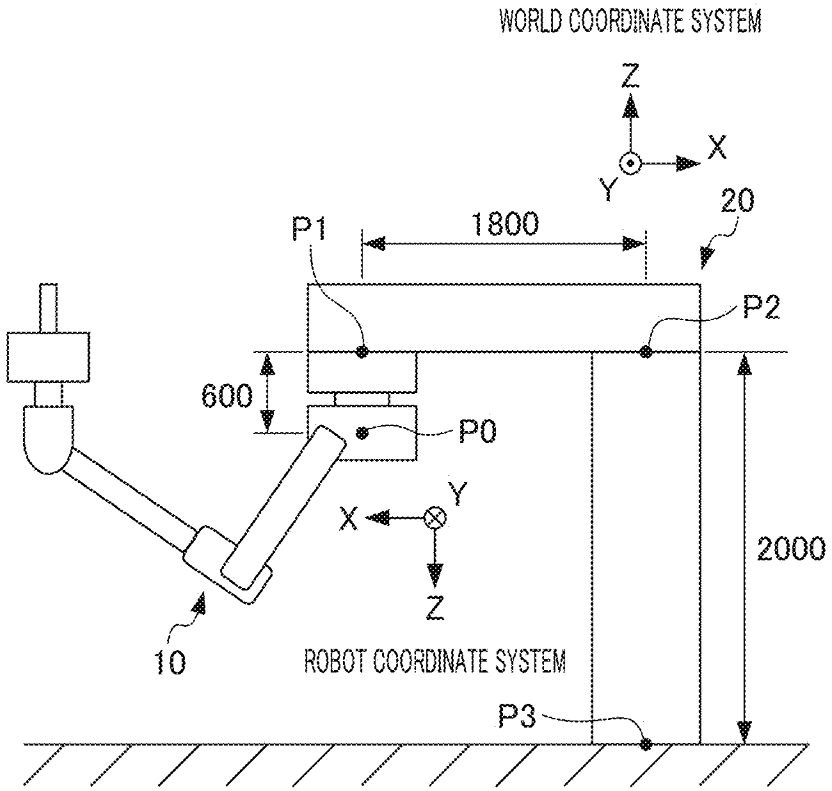
FIG. 3 is a schematic view that illustrates an example of setting a support model in the robot system in FIG. 1.

In the example in FIG. 3, the support model Ms is defined as links connected from an origin P0 in the robot coordinate system in which the articulated robot 10 operates. Apart from the origin P0, the support model Ms has three joint points P1, P2, P3 which are set in order from the origin P0. In this example, positions of the joint points P1, P2, P3 are defined by coordinates in the robot coordinate system for the articulated robot 10. In more detail, each of the joint points P1, P2, P3 is respectively specified by position and direction in an XYZWPR format in the robot coordinate system, and a spring constant is set for each axial direction for a link between the respective one of the joint points P1, P2, P3 and one previous joint point. The support model Ms can be individually set by, inter alia, a system administrator at a time of system installation, for each robot system 1.

As a different example, the support model setting unit 42 may define the support model Ms as a reference table that, for each category of force that acts on the support 20, specifies a representative value for an amount of elastic deformation by the support 20. Specifically, the support model Ms may be a reference table that associates the magnitude of a moment of force acting on the origin P0 with an amount of elastic deformation, i.e., a theoretical amount of movement by the tip end 12 for before and after command value correction.

The initial value input unit 43 inputs an initial value, which is for a parameter in an error model as exemplified in FIG. 3, to the support model setting unit 42. Although the initial value input unit 43 may accept an input from an input device such as a keyboard, for example, it may be configured to read in an error model initial value created by an external computer C. Although not particularly limited, the computer C is assumed to be a general-purpose personal computer, a tablet computer, or the like. It is possible to, comparatively easily and accurately, construct an error model by using offline simulation software that can be executed by the computer C and is for creating a model of the support 20. In addition, by configuring such that the external computer C is used to construct the error model, it becomes easy to integrally configure the robot control device 30 and the command value correction device 40, i.e., to add functionality for the command value correction device 40 to a conventional robot control device.

The force calculation unit 44 calculates a force acting on the support 20 in a case where the articulated robot 10 has taken an orientation that conforms to a command value before correction. In more detail, the force calculation unit 44 calculates a rotational force, i.e., moment of force, acting on the joint point P0, and consequently the joint points P1, P2, P3, in the support model Ms, due to the weight of the articulated robot 10 and the support 20 in a case where the articulated robot 10 is stationary at an orientation conforming to a command value. Furthermore, the force calculation unit 44 may calculate a force (compressive/tensile force) that acts on the joint points P0, P1, P2, P3 in a translational direction. In addition, it is desirable for the force calculation unit 44 to individually calculate forces that act on the joints J1, J2, J3, J4, J5, J6 in the robot model Mr.

The correction unit 45 corrects a command value inputted from the robot control device 30 in such a manner as to cancel out the elastic deformation for the support model Ms due to the force calculated by the force calculation unit 44. It is preferable for the correction unit 45 to correct a command value inputted from the robot control device 30 such that, in addition to the support model Ms, elastic deformation for the robot model Mr is also canceled out.

The correction unit 45 can be established in a configuration having a robot deformation calculation unit, a support model deformation calculation unit, an error calculation unit, and a command value recalculation unit.

The robot deformation calculation unit calculates amounts of elastic deformation for the links L1, L2, L3, L4, L5 and the joints J1, J2, J3, J4, J5, J6 in the robot model Mr for a case in which the orientation of the articulated robot 10 conforms to a command value before correction. Although the amount of elastic deformation for the robot model Mr is calculated using a well-known method, it is typically calculated based on forces respectively acting on the joints J1, J2, J3, J4, J5, J6 that are calculated by the force calculation unit 44.

The support model deformation calculation unit calculates an amount of elastic deformation for the support model Ms (also referred to as an "amount of support model elastic deformation") from the forces calculated by the force calculation unit 44. In other words, from the forces that act on P1, P2, and P3 calculated by the force calculation unit 44 as well as the spring constants for between joint points that are set by the support model setting unit 42, the support model deformation calculation unit calculates respective amounts of movement for P1, P2, and P3 due to elastic deformation, and calculates the change in position and direction of the origin P0 as a result thereof.

Based on the amount of elastic deformation that is for the support model Ms and is calculated by the support model deformation calculation unit and the amount of elastic deformation that is for the robot model Mr and is calculated by the robot deformation calculation unit, the error calculation unit calculates positioning error for the tip end 12 of the articulated robot 10.

The command value recalculation unit calculates such a command value that designates the orientation of the articulated robot 10 in a state where the tip end 12 is made to move in the direction opposite by the same distance as the positioning error calculated by the error calculation unit. This corrected command value is inputted to the articulated robot 10, whereby it is possible to reduce positioning error for the tip end 12.

The deformation amount obtainment unit 46 obtains an actual amount of elastic deformation by the support 20 (also referred to as an "amount of actual elastic deformation"). Specifically, the deformation amount obtainment unit 46 can be configured to specify an actual amount of elastic deformation of the support 20, based on a reference point (a measurable point for which a relative position with respect to the reference support point 21 does not change substantially) on the support 20 that is measured by the three-dimensional measurement device 50, or a relative position of the tip end 12 of the articulated robot relative to an immovable point in the world coordinate system.

Obtaining the actual amount of elastic deformation by the support 20 based on the position of the tip end 12 belonging to the articulated robot 10 can be performed by calculating an estimated value for the actual amount of elastic deformation by the support 20, assuming that deviation between the actual position of the tip end 12 measured by the three-dimensional measurement device 50 and the theoretical position of the tip end 12 calculated from a command value considering the robot model Mr is caused only by error in the support model Ms. An initial value for a parameter in the robot model Mr for an articulated robot 10 that is mass-produced has comparatively little error; whereas, the initial value of a parameter in the support model Ms for supports 20 which have individually different designs is likely to have a comparatively large error. Accordingly, the amount of elastic deformation by the support 20 calculated from the actual position of the tip end 12 assuming that the robot model Mr has no error is considered to be a value closer to the actual amount of elastic deformation by the support 20 than the theoretical amount of elastic deformation calculated from the support model Ms initially set.

The support model correction unit 47 corrects a parameter in the support model Ms in such a manner as to make an amount of support model elastic deformation calculated by the support model deformation calculation unit based on the command value inputted to the articulated robot 10 when the deformation amount obtainment unit 46 obtained an amount of actual elastic deformation, approach the amount of actual elastic deformation obtained by the deformation amount obtainment unit 46.

The measurement orientation command unit 48 generates a plurality of measurement command values for causing the articulated robot 10 to assume different measurement orientations for causing a predetermined torque to act on the support 20. By causing the articulated robot 10 to assume a plurality of measurement orientations at which the amounts of elastic deformation by the support 20 are equal, it is possible to confirm a positioning error for the tip end 12 due to only elastic deformation by the articulated robot 10. It should be noted that it is also possible to calculate the actual amount of elastic deformation by the support 20 at the same time as confirming elastic deformation by the articulated robot 10 in accordance with a measurement command value.

Based on the position of the tip end 12 in a state where the articulated robot 10 has taken an orientation that conforms to a measurement command value, the robot model correction unit 49 confirms the positioning error for the tip end 12 of the articulated robot 10, and corrects a parameter in the robot model Mr. As a result, in a case of correcting the support model Ms based on the position of the tip end 12 of the articulated robot 10, it is possible to more accurately correct the support model Ms.

As illustrated, the three-dimensional measurement device 50 is installed immovably in the world coordinate system, i.e., such that the position thereof does not change depending on the orientation of the articulated robot 10, and can be provided in order to measure the relative position of at least one of the tip end 12 of the articulated robot 10 and the reference point for the support 20, relative to the position of the three-dimensional measurement device 50 itself. In addition, the three-dimensional measurement device 50 may be immovably installed with respect to the reference point for the support 20 or the tip end 12 of the articulated robot 10 and provided in such a manner as to measure, relative to the position of the three-dimensional measurement device 50 itself, the relative position of a measurement point that is immovably provided in the world coordinate system.

Figure 4:
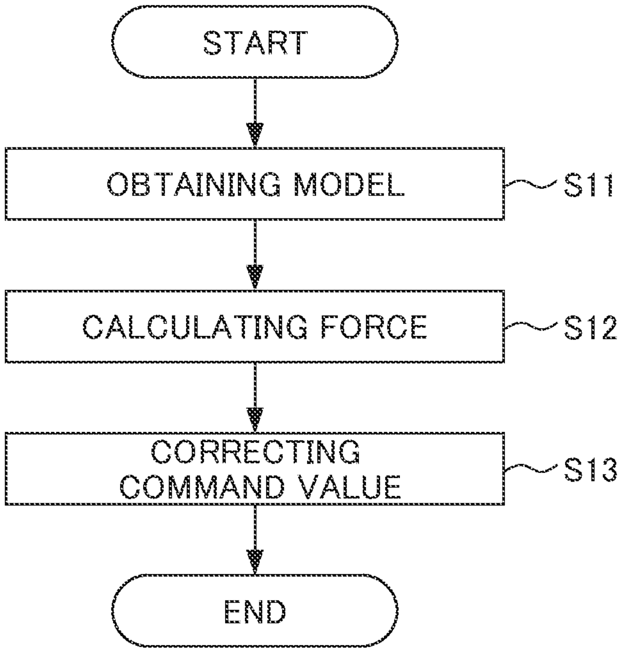
FIG. 4 is a flow chart that illustrates a procedure for command value correction in the robot system in FIG. 1.

FIG. 4 illustrates a procedure for correction of a command value by the command value correction device 40. Correction of a command value includes a model obtainment step (Step S11), a force calculation step (Step S12), and a command value correction step (Step S13).

In the model obtainment step in Step S11, the robot model Mr set by the robot model setting unit 41 and the support model Ms set by the support model setting unit 42 are obtained, in other words, read into working memory in the computer configuring the robot control device 30.

In the moment calculation step in Step S12, in a case where the articulated robot 10 has taken an orientation conforming to a command value before correction for the robot model Mr and the support model M, the force calculation unit 44 calculates a moment of force acting on the articulated robot 10 and the support 20 due to gravity.

In the command value correction step in Step S13, the command value is corrected such that the position of the tip end 12 calculated using the robot model Mr and the support model Ms becomes the position of the tip end 12 intended by the command value before correction, i.e., the position of the tip end 12 for which no consideration is given to elastic deformation of the articulated robot 10 and the support 20.

Figure 5:
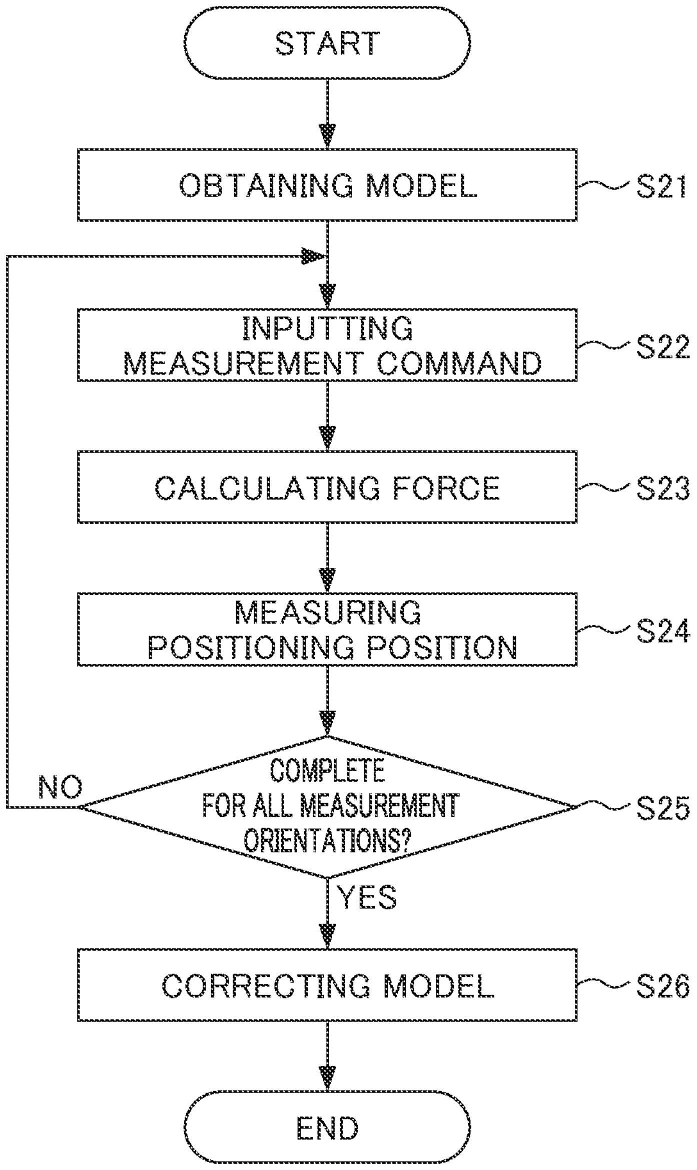
FIG. 5 is a flow chart that illustrates a procedure for error model correction in the robot system in FIG. 1.

FIG. 5 illustrates a procedure for correction of the robot model Mr and the support model Ms by the command value correction device 40. Correction of the robot model Mr and the support model Ms includes a model obtainment step (Step S21), a measurement command value input step (Step S22), a force calculation step (Step S23), a positioning position measurement step (Step S24), a measurement orientation end confirmation step (Step S25), and a model correction step (Step S26).

In the model obtainment step in Step S21, the robot model Mr set by the robot model setting unit 41 and the support model Ms set by the support model setting unit 42 are obtained.

In the measurement command value input step in Step S22, the measurement orientation command unit 48 inputs a measurement command value to the articulated robot 10 to cause the articulated robot 10 to take a measurement orientation.

In the force calculation step in Step S23, the moment of force acting for the measurement orientation instructed in Step S22 is calculated.

In the positioning position measurement step in Step S24, the three-dimensional measurement device 50 measures the position of the tip end 12 of the articulated robot 10 at the measurement orientation instructed in Step S22.

In the measurement orientation end confirmation step in Step S25, it is confirmed whether the steps of Steps S22 through S24 have been performed for all preset measurement orientations. The steps of Step S22 through S24 are repeated until processing completes for all measurement orientations, and the processing advances to Step S26 once processing completes for all measurement orientations.

In the model correction step in Step S26, based on a combination of a theoretical position and actually-measured position for the position of the tip end 12 calculated using the robot model Mr and the support model Ms at each measurement orientation, parameters in the robot model Mr and the support model Ms are corrected such that the theoretical positions for the position of the tip end 12 calculated using the robot model Mr and the support model Ms approach the actually-measured positions.

In the above way, the robot system 1 is provided with the support model setting unit 42, which sets the support model Ms, and uses the support model Ms to correct a command value, and thus can accurately position the tip end 12 by compensating for elastic deformation of the support 20 corresponding to the orientation of the articulated robot 10.

In addition, the robot system 1 is provided with the support model correction unit 47, which corrects the support model Ms based on an amount of elastic deformation obtained by the deformation amount obtainment unit 46, and thus can more accurately position the tip end 12 by accurately predicting an amount of elastic deformation of the support 20.

Although a description has been provided above regarding an embodiment for a robot system and command value correction device according to the present disclosure, the scope for the present disclosure is not to be limited to the embodiment described above. In addition, the effects set forth in the embodiment described above merely list the most preferred effects that arise from the robot system and command value correction device according to the present disclosure. The effects from the robot system and command value correction device according to the present disclosure are not limited to those set forth in the embodiment described above.

The robot system and command value correction device according to the present disclosure may not necessarily have a configuration pertaining to correction of a support model or correction of a robot model. In addition, the procedure for correction of a robot model and a support model is not limited to the procedure described above, and may be performed using another algorithm. As an example, correction of a support model and correction of a robot model may be performed independently. Accordingly, obtaining an amount of elastic deformation for correcting a support model and obtaining an amount of elastic deformation for correcting a robot model may be performed at different orientations.

EXPLANATION OF REFERENCE NUMERALS

1 Robot system
10 Articulated robot
20 Support
30 Robot control device
40 Command value correction device
50 Three-dimensional measurement device
11 Arm
12 Tip end
41 Robot model setting unit
42 Support model setting unit
43 Initial value input unit
44 Force calculation unit
45 Correction unit
46 Deformation amount obtainment unit
47 Support model correction unit
48 Measurement orientation command unit
49 Robot model correction unit

The invention claimed is:

1. A command value correction device configured to correct a command value for instructing an orientation of an articulated robot that positions a tip end of an arm having a plurality of joints, the command value correction device comprising:

a robot model setting unit configured to set a robot model that represents the articulated robot by an elastically deformable model;

a support model setting unit configured to set a support model that represents a support to which the articulated robot is secured, by an elastically deformable model;

a force calculation unit configured to calculate a force that acts on the support according to weight of the articulated robot in a case where the orientation of the articulated robot conforms to the command value before correction;

a correction unit configured to correct the command value in such a manner as to cancel out an amount of support model elastic deformation that is elastic deformation for the support model due to the force calculated by the force calculation unit;

a deformation amount obtainment unit configured to obtain an actual position of the tip end; and a robot model correction unit configured to correct a parameter in the robot model and a parameter in the support model based on the actual position of the tip end.

2. The command value correction device according to claim 1, wherein the deformation amount obtainment unit is configured to calculate an amount of actual elastic deformation that is an actual amount of elastic deformation by the support based on the actual position of the tip end; and the model correction unit is configured to correct a parameter in the support model in such a manner as to make the amount of support model elastic deformation, calculated based on the command value inputted to the articulated robot when the deformation amount obtainment unit calculated the amount of actual elastic deformation, approach the amount of actual elastic deformation obtained by the deformation amount obtainment unit.

3. The command value correction device according to claim 2, wherein the deformation amount obtainment unit is provided to obtain a relative position of a reference point for the support with respect to an immovable point in a world coordinate system.

4. The command value correction device according to claim 2, wherein the deformation amount obtainment unit is provided to obtain a relative position of the tip end with respect to an immovable point in a world coordinate system.

5. The command value correction device according to claim 4, further comprising:

a measurement orientation command unit configured to generate a plurality of measurement command values for causing the articulated robot to assume different measurement orientations for causing a predetermined torque to act on the support.

6. The command value correction device according to claim 1, wherein the support model is defined as a reference table that, for each category of force that acts on the support, specifies a representative value for the amount of support model elastic deformation.

7. The command value correction device according to claim 1, wherein the support model has at least one joint point that moves or rotates in a direction parallel to a force that acts on the support.

8. The command value correction device according to claim 1, further comprising:

an initial value input unit configured to input, to the support model setting unit, an initial value for a parameter in the support model.

9. The command value correction device according to claim 8, wherein the initial value input unit reads the initial value for the parameter which was created by an external computer.

10. A robot system, comprising:

the command value correction device according to claim 1;

a robot control device configured to input a command value according to a program to the command value correction device; and an articulated robot configured to operate in accordance with a command value corrected by the command value correction device.

11. The command value correction device according to claim 4, further comprising:

a measurement orientation command unit configured to generate a plurality of measurement command values for causing the articulated robot to assume different measurement orientations at which the amounts of elastic deformation by the support are equal.

12. The command value correction device according to claim 1, wherein the robot model correction unit corrects one of the parameter in the robot model and the parameter in the support model, and then corrects other of the parameter in the robot model and a parameter in the support model.

* * * * *